O. TYBERG.
CIGAR MACHINE.
APPLICATION FILED AUG. 27, 1901.

1,075,172.

Patented Oct. 7, 1913.
10 SHEETS—SHEET 1.

Witnesses:

INVENTOR

ATTORNEYS

O. TYBERG.
CIGAR MACHINE.
APPLICATION FILED AUG. 27, 1901.
1,075,172.
Patented Oct. 7, 1913.
10 SHEETS—SHEET 2.
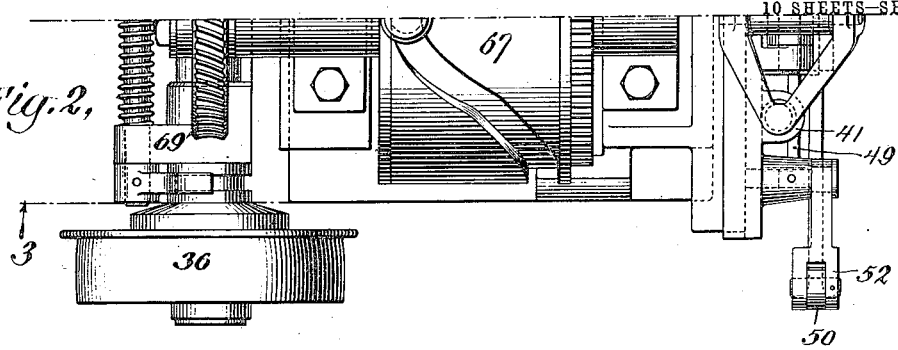
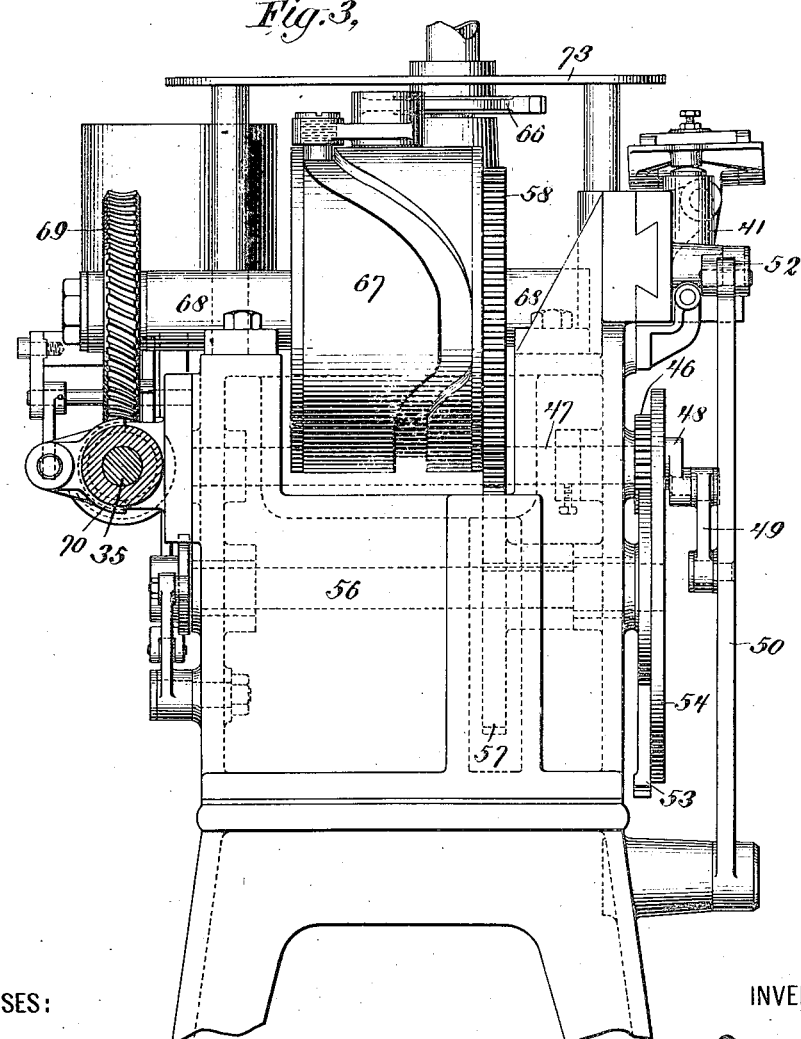

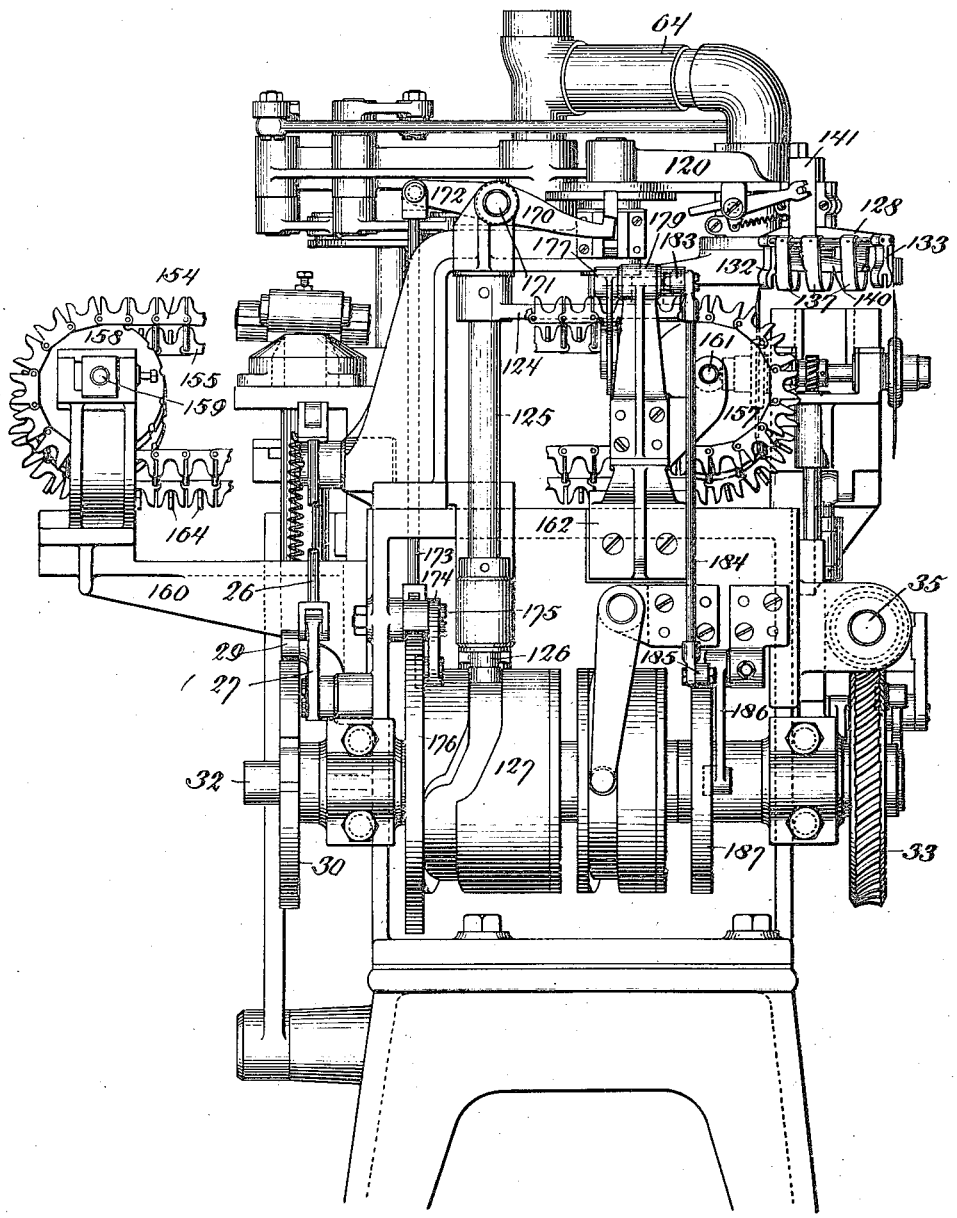

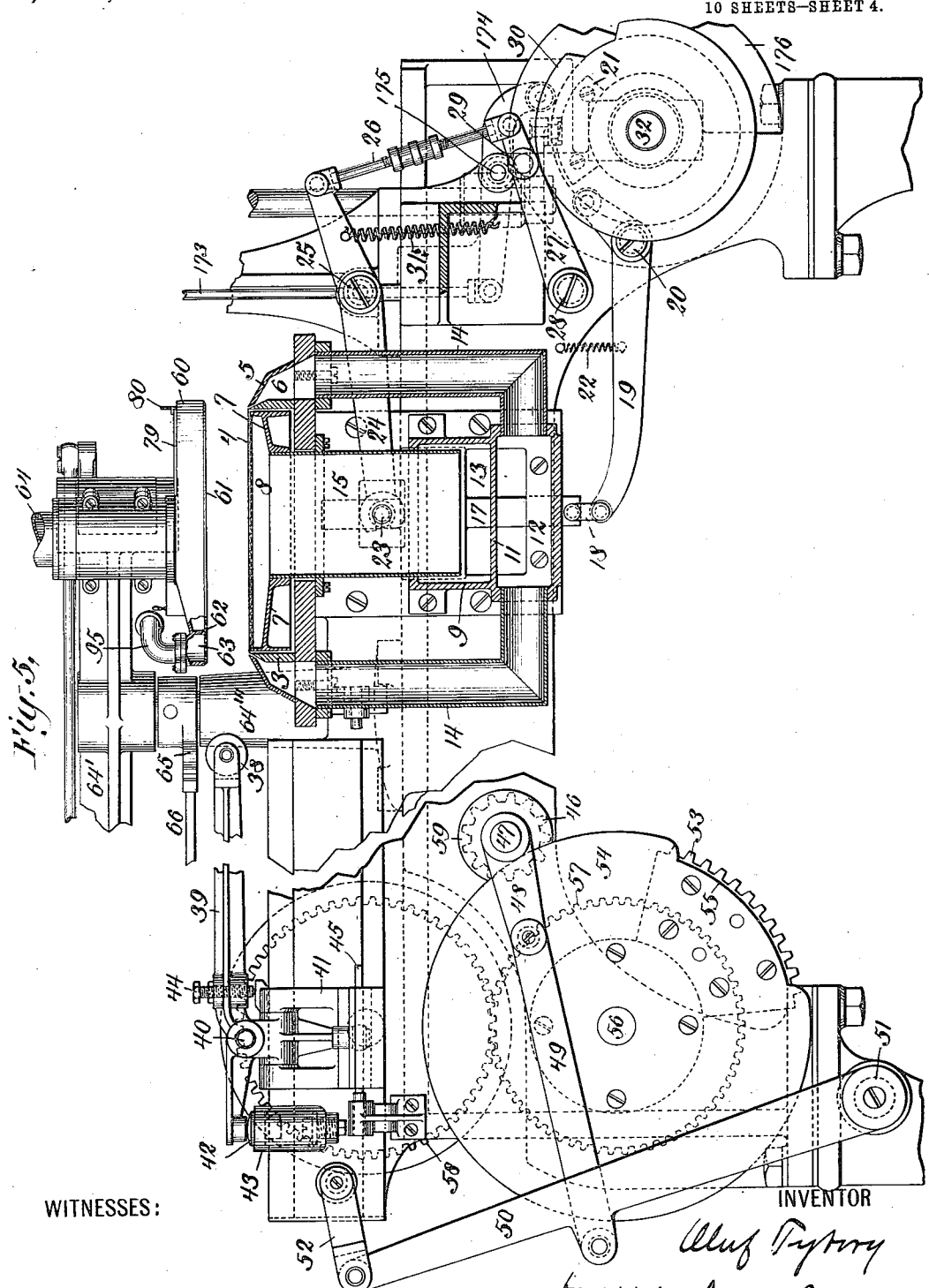

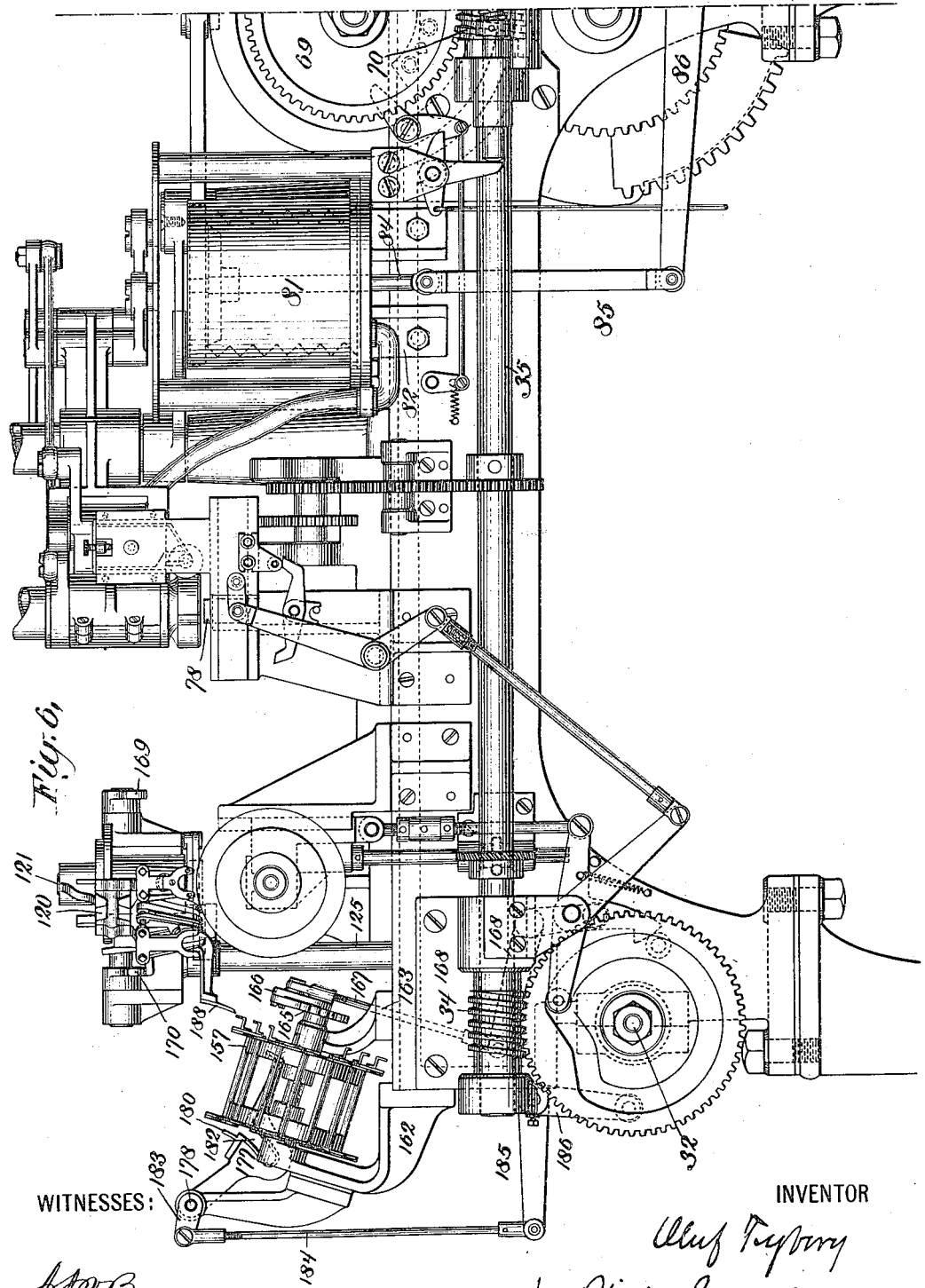

O. TYBERG.
CIGAR MACHINE.
APPLICATION FILED AUG. 27, 1901.

1,075,172.

Patented Oct. 7, 1913.
10 SHEETS—SHEET 6.

WITNESSES:

INVENTOR

O. TYBERG.
CIGAR MACHINE.
APPLICATION FILED AUG. 27, 1901.
1,075,172.
Patented Oct. 7, 1913.
10 SHEETS—SHEET 7.
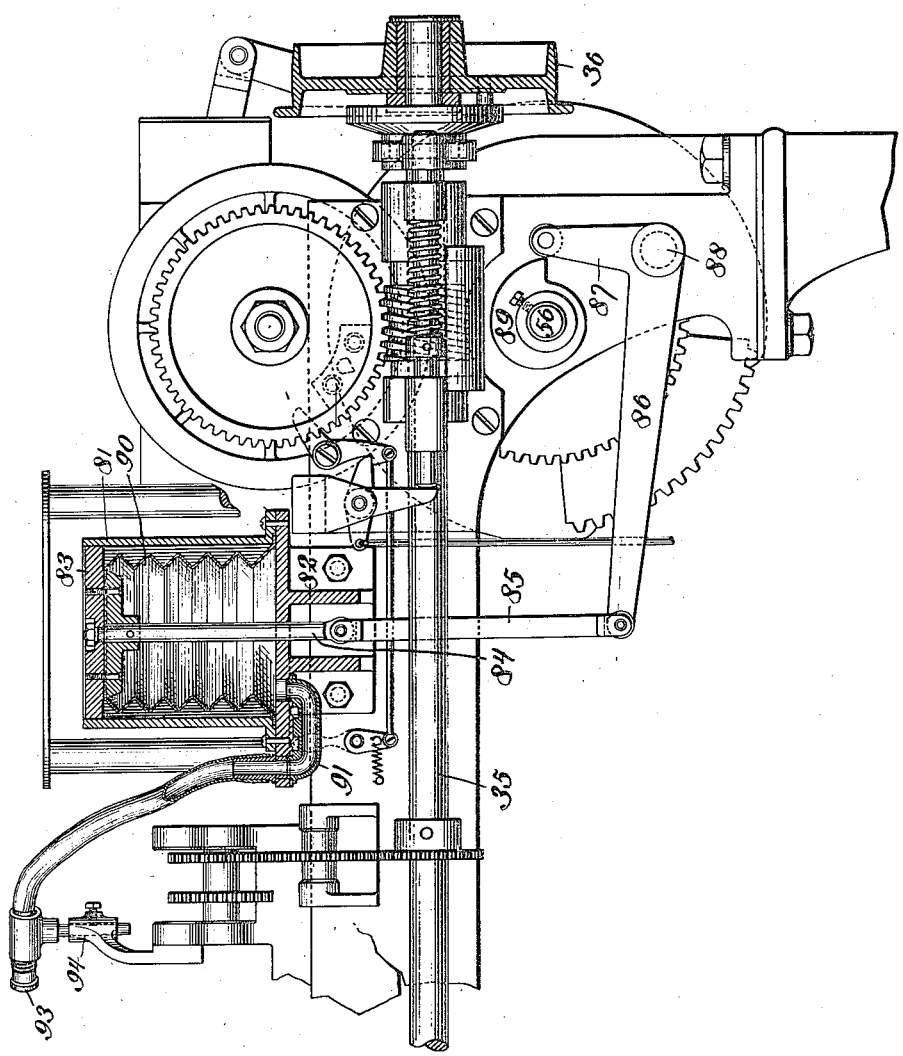
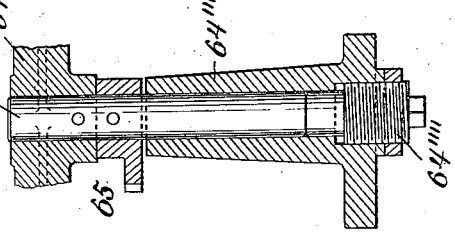
WITNESSES:
INVENTOR
ATTORNEYS

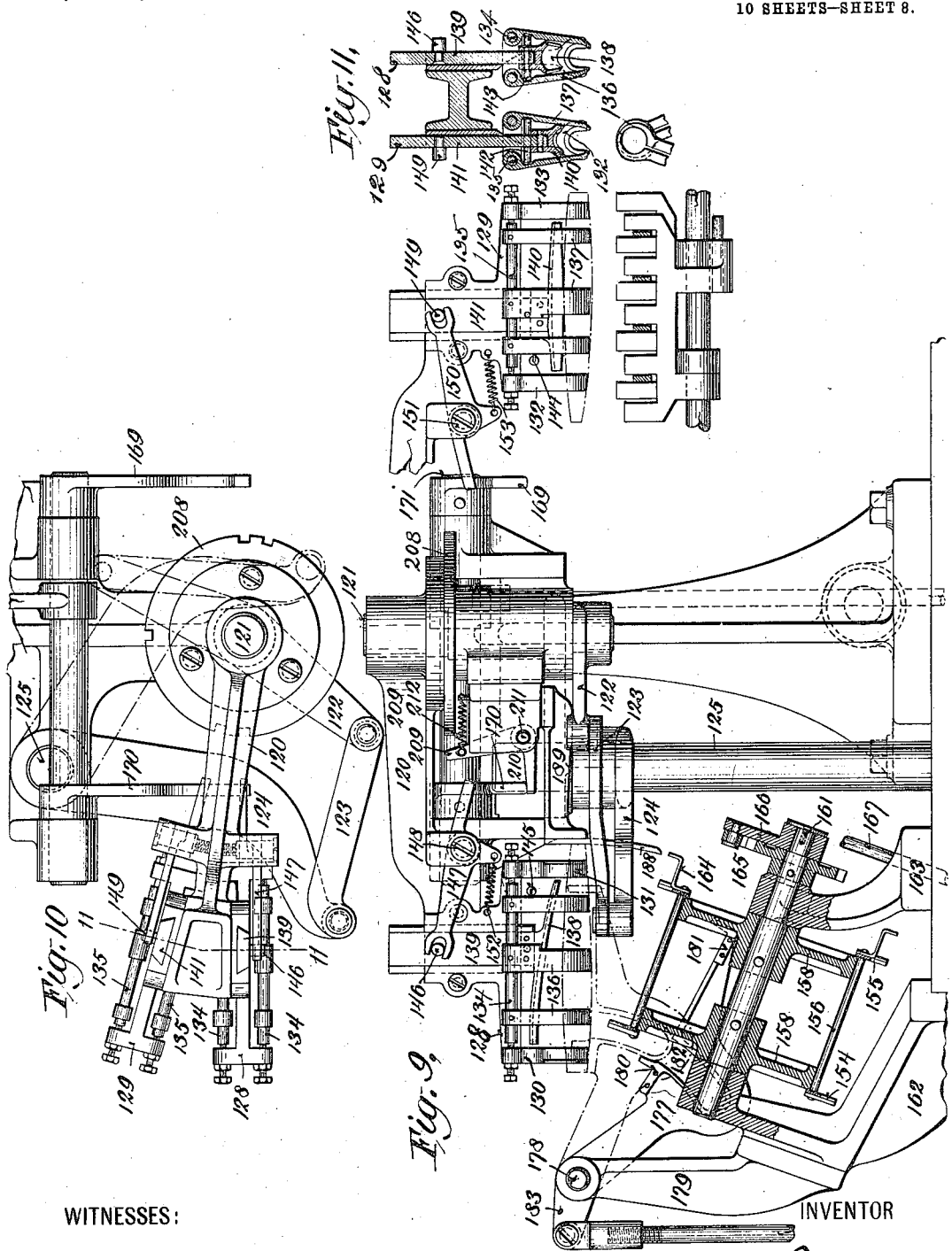

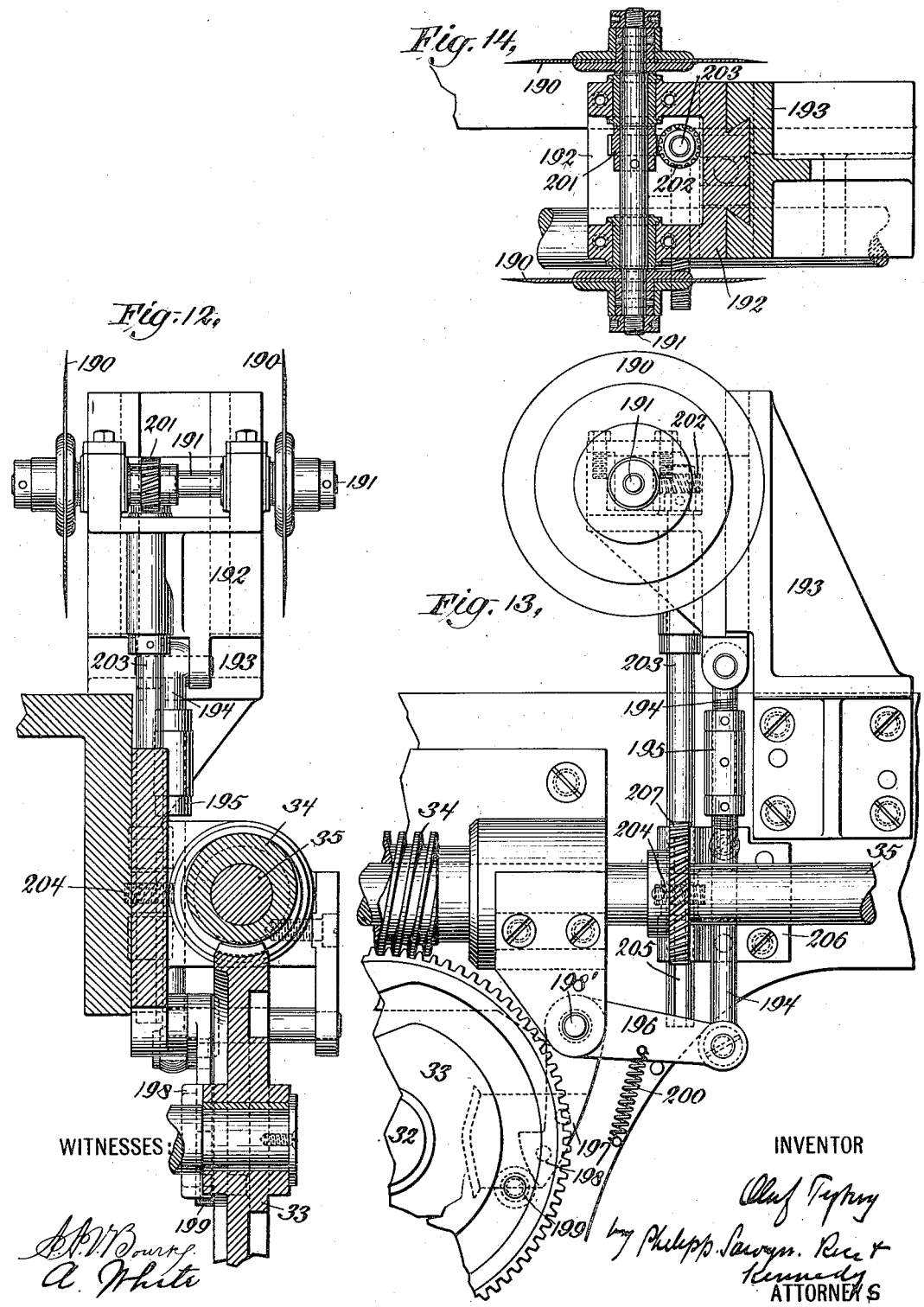

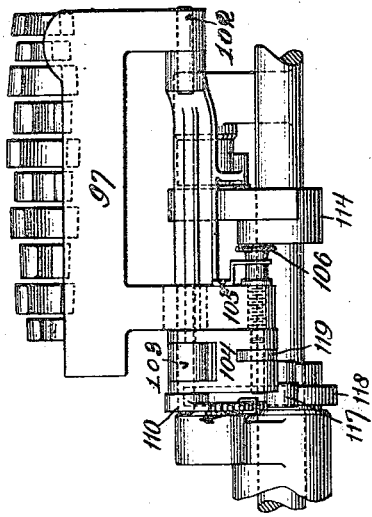
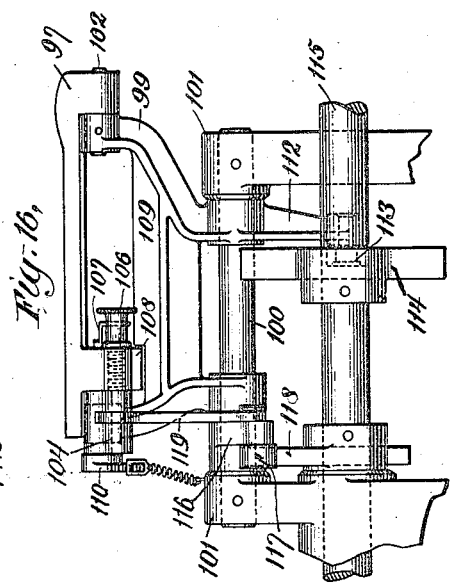
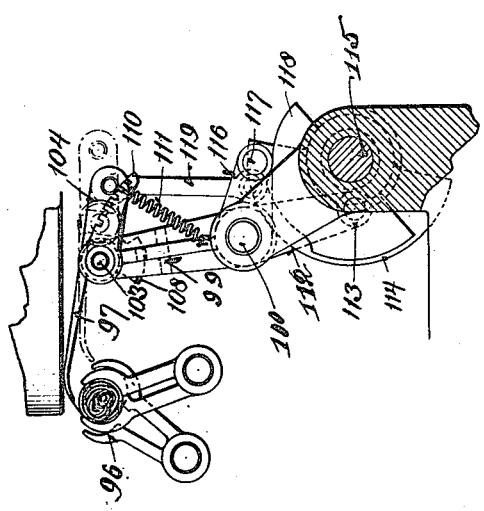

UNITED STATES PATENT OFFICE.

OLUF TYBERG, OF NEW YORK, N. Y., ASSIGNOR TO RUFUS L. PATTERSON AND GEORGE ARENTS, JR., OF NEW YORK, N. Y.

CIGAR-MACHINE.

1,075,172.  Specification of Letters Patent.  Patented Oct. 7, 1913.

Application filed August 27, 1901. Serial No. 73,409.

*To all whom it may concern:*

Be it known that I, OLUF TYBERG, a citizen of the United States, residing at New York, county of Kings, and State of New York, have invented certain new and useful Improvements in Cigar-Machines, fully described and represented in the following specification and the accompanying drawings, forming a part of the same.

This invention relates to certain improvements in cigar machines.

In the United States Patent No. 654,203, granted July 24, 1900, to R. L. Patterson and George Arents, Jr., as assignees of Oluf Tyberg, a cigar machine is disclosed in which a wrapper is first cut, then transferred to a wrapping mechanism in which a bunch has been automatically placed, and the wrapped bunch or cigar, after it has been wrapped by the wrapping mechanism, is automatically transferred to a delivery point by an automatic bunch carrier.

The present invention has for its object to produce an improved cigar machine of the type generally disclosed in the patent above referred to.

As the invention can best be understood from a detailed description of a construction embodying the same, such a description will now be given, reference being had to the accompanying drawings which form a part of this specification and in which like characters of reference indicate the same parts.

Figure 1:
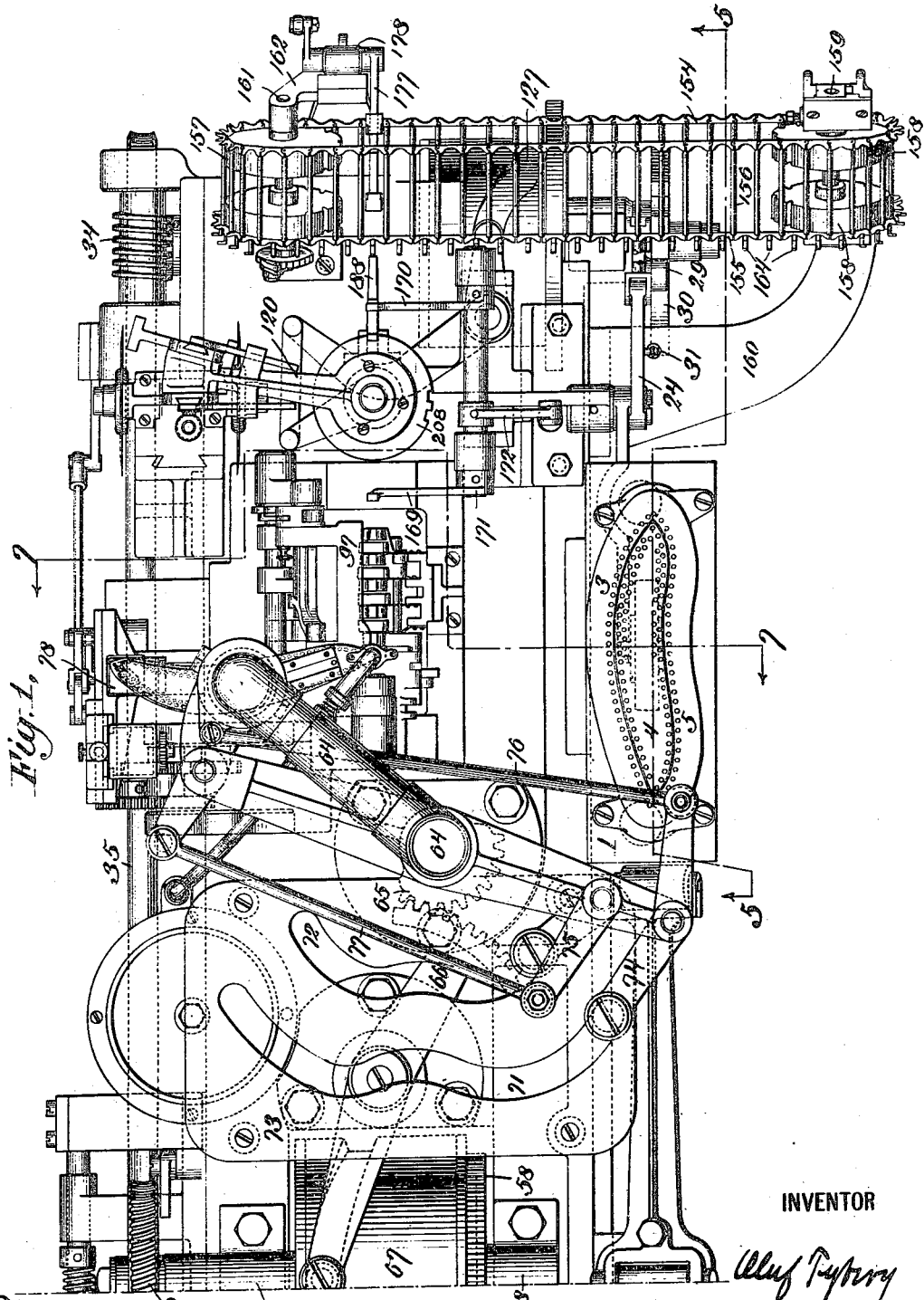
Figure 7:
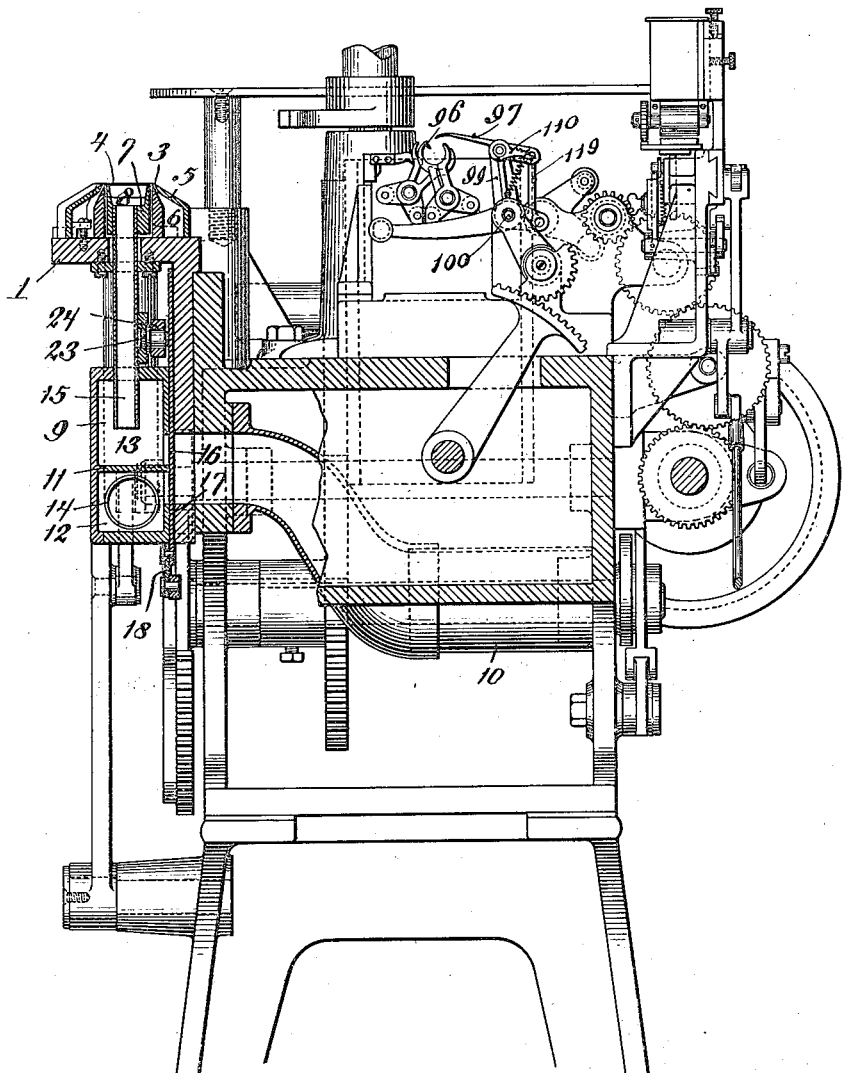

Referring to said drawings:—Figure 1 is a plan view of the major portion of the machine. Fig. 2 is a plan view of that portion of the machine not shown in Fig. 1. Fig. 3 is a sectional end elevation of the machine, the position of the observer being indicated by the arrow 3 in Fig. 2. Fig. 4 is a view of the end of the machine opposite to that shown in Fig. 3. Fig. 5 is a sectional front elevation of the machine, the plane of section being indicated by the line 5—5 of Fig. 1, the bunch support being omitted and certain of the operating parts of the machine being broken away. Fig. 6 is a rear elevation of that portion of the machine shown in Fig. 1. Fig. 7 is a sectional elevation on the line 7—7 of Fig. 1, the view being taken in the direction of the arrow 7 in said figure, and certain parts of the machine being omitted. Fig. 8 is a detail elevation, partly in section, illustrating more particularly the blast mechanism and the parts immediately connected therewith. Fig. 9 is a detail elevation, partly in section, illustrating the carrier for the bunch and the completed cigar or wrapped bunch, and the traveling bunch support, the bunch carrier being shown in two positions. Fig. 10 is a plan view of a portion of the construction shown in Fig. 9 illustrating more particularly the construction of the bunch carrier. Fig. 11 is a sectional view on the line 11—11 of Fig. 10. Figs. 12, 13 and 14 are detail views illustrating the construction of the cutting mechanism. Figs. 15, 16 and 17 are detail views illustrating the construction of the device for applying tension to the wrapper as it is drawn from the wrapper support by the wrapping mechanism. Fig. 18 is a detail view of the means for adjusting the wrapper support with respect to the wrapping mechanism.

In the specific machine which has been selected to illustrate the present invention, as in the machine of Patent No. 654,203 above referred to, the wrapper is first cut by suitable cutting mechanism from a leaf of tobacco. After the wrapper has been cut, it is delivered to a transfer mechanism which includes a support on which the wrapper is held by suitable retaining mechanism, preferably by suction. The transfer mechanism then operates to deliver the wrapper to a wrapping mechanism in which a bunch has previously been deposited by an automatic feeding mechanism. After the bunch has been wrapped, it is removed from the wrapping mechanism by suitable automatic devices, and the operations before described are repeated.

The cutting mechanism will first be described, reference being had more particularly to Figs. 1, 5 and 7. Referring more particularly to Figs. 5 and 7, 1 indicates a bracket which may be secured to the frame of the machine in any suitable manner. This bracket is preferably angular in form, as shown, and supports a knife 3 which may be of any suitable construction and of any suitable shape according to the material to be cut and the configuration it is desired to give it. Preferably, however, when the mechanism is used to cut a cigar wrapper, as in the present machine, the knife will be generally elliptical in form. The form will, however, be varied from a true ellipse in order to produce a wrapper of a shape which can be readily manipulated by the wrapping mechanism so as to be smoothly wrapped upon the bunch.

It is desirable that the leaf of tobacco from which the wrapper is to be cut should be thoroughly stretched before cutting and be held stretched after the cutting operation. While this may be effected in various ways, in the construction shown, the leaf will be stretched on the cutting bed by the operator and suction will be utilized for holding it stretched. The devices by which the suction is utilized may be the same as those described in the patent above referred to. As shown, however, the cutting bed is preferably formed from perforated plates 4, 5, the plate 4 lying inside the knife and the plate 5 lying outside or surrounding the knife. The plate 5 may consist, as shown, of an angularly shaped casting which rests upon the bracket 1. The said casting together with the bracket 1 forms three sides of a chamber 6, the other side being formed by the knife 3. The plate 4 is secured to a casting 7, the upper side of which is formed to provide a chamber 8 which is closed by the plate 4. Any suitable means may be employed for establishing suction in the chambers 6 and 8. Preferably, however, as in the said Patent No. 654,203, an intermediate chamber 9 will be provided, said chamber having connected thereto a suction pipe 10 which leads to any suitable suction producing mechanism, as a fan, not shown. The chamber 9 may be connected to the chambers 6 and 8 in any desired manner. It is preferable, for a reason which will hereinafter appear, to so arrange these connections that the suction in these chambers 6 and 8 may be independently controlled. To this end, therefore, the chamber 9, by means of a partition 11, is divided into two parts, 12 and 13, one of said chambers being connected with the chamber 6 and the other with the chamber 8. The connections referred to may be of any suitable character. As shown, however, pipes 14 lead from the chamber 12 to the chamber 6, and a pipe 15 leads from the chamber 13 to the chamber 8.

Any suitable means may be employed for opening and closing the connection between the two-part chamber 9 and the suction pipe 10. In the construction shown, however, a sliding valve 16 is employed for this purpose which may be operated in any convenient manner. As shown, this valve is provided with an extension 17 which is connected by means of a link 18 to a lever 19 pivoted at 20 to the frame of the machine and operated by means of a cam 21 which will be hereinafter referred to, the movement of the lever in opposition to the cam being preferably produced by means of a spring 22. It will be seen that the movement of the valve 16 is such that it closes the opening between the pipe 10 and the part 13 of the two-part chamber 9 before it closes the opening leading into the part 12 of this chamber because it moves across this opening first. The suction will, therefore, be cut off from the chamber 13 before it is cut off from the chamber 12. By thus controlling the suction, the cut portion of the leaf which forms the wrapper can be removed from the plate 4 while the suction is still acting upon the chamber 6 and plate 5. The outer portion of the leaf, therefore, is held on the cutting table and is thus prevented from being taken off with the wrapper or in any way interfering with the means for transferring it.

As in said Patent No. 654,203, the wrapper is delivered from the cutting mechanism to the wrapper support to be hereinafter described, by means of a relative movement produced between the support and the inner plate 4 which forms a portion of the cutting bed, this relative movement being produced by giving a movement to the plate. The means by which the movement of the plate is effected may be of any suitable character. As shown, however, the pipe 15 has secured thereto a stud 23 which is engaged by a fork on a lever 24 pivoted at 25 to the frame of the machine. The opposite end of this lever is connected by means of a link and turn buckle 26 to a lever 27 pivoted at 28 to the frame of the machine. This lever 27 has a roller 29 which bears on a cam 30. This cam, through the connections described, operates to lower the pipe 15 and plate 4 and keep them in their proper position. The movement by which the plate is raised is produced, in the construction shown, by means of a spring 31 connected at one end to the lever 25 and to the frame of the machine at the other end.

The cams 21 and 30 may be driven in any suitable manner. In the construction shown, the cam 21 is secured to the cam 30, and this cam is mounted on a shaft 32 which is mounted in one end of the machine (see Fig. 4), said shaft being driven by a worm gear 33 which is mounted thereon. This worm gear 33 is driven in turn (see Fig. 1) by a worm 34 mounted on a shaft 35 which runs along the back side of the machine from one end to the other. The shaft 35 is the main driving shaft of the machine and is provided (see Figs. 2 and 8) with a belt pulley 36 which may be secured to and disconnected from the shaft 35 by means of a clutch mechanism hereinafter referred to. By the connections described, it is apparent that as the cams 30 and 21 rotate, the plate 4 carrying the wrapper will be raised so that the wrapper may be removed by the support hereinafter referred to and the suction will be successively cut off from the chambers 13 and 12. It may be here remarked that the cam 21 is so shaped as to produce a slight dwell in the movement of the valve 16 after it has closed the connection with the chamber 13. In other words, the valve first shuts off the suction so that the wrapper can be removed from the plate 4, then shuts off the suction from the chamber 6, so that the outside portion of the leaf can be removed from the plate 5.

The devices which coöperate with the knife 3 to cut the wrapper may be of any suitable description. Preferably, however, they will be like those disclosed in the Patent No. 654,203 above referred to, being arranged in the construction shown in said patent to coöperate first with one side of the knife and then with the other. Said devices are fully described in said patent and for the purpose of this application, it is sufficient to say, therefore, that they consist (see Fig. 5) of a roller 38 mounted on a lever 39 which is pivoted at 40 to a carriage 41 reciprocating in ways in the machine, the lever 39 being held so as to properly position the roller 38 by means of a spring plunger 42 located in a cup 43, a suitable stop 44 being provided to limit the movement of the lever under the stress of the spring. The lever 39 and its roller 38 are shaped so as to shift the position of the roller with respect to the knife so that it coöperates first with one side of it and then with the other by a cam-plate 45 which is or may be constructed and operated in the same manner as the cam plate described for this purpose in said patent. The means for operating the carriage 41 are, however, different from those shown in said patent, being simpler. In the present case, the system of clutches used in the former construction is eliminated and a gear which is driven from a constantly moving part is utilized for the purpose of producing the movement, through the carriage, of the coöperating cutting device. The construction by which the gear referred to is driven and the connections by which its movement is made effective to produce the movement of the coöperating cutting device (which, in the present construction, as has been stated, is the roller 38) may be varied within wide limits. In the present construction, said gear, which is marked 46 (see Fig. 3 and dotted lines in Fig. 5) is mounted on a shaft 47 extending across the machine from side to side, said shaft being provided with a crank arm 48 which is connected by means of a link 49 to a lever 50 pivoted at 51 to the machine frame. This lever is in turn connected by means of a short link 52 to the carriage 41. The constantly rotating part by which the gear 46 is driven, in the present machine, consists of a segment 53 which may be mounted and operated in any suitable manner. As shown, it is secured to a disk 54 having a cut away portion 55 for a purpose to be hereinafter explained. The disk 54 is mounted on a countershaft 56 extending across the machine from side to side. This shaft 56 is provided with a gear 57 which meshes with a gear 58. The means for driving this gear will be hereinafter described. It will be seen that as the gear 58 is rotated, the segment 53 will operate the gear 46 once in each revolution of the disk 54, the segment being of sufficient length to produce a complete rotation of the gear, and a complete rotation of the gear, as is obvious, will produce one complete reciprocation of the carriage 41 and coöperating cutting roller, thus effecting the cutting of a wrapper.

In order that the gear 46 may be always held in such position that the segment 53 will run cleanly into engagement with it, locking means are preferably provided which will hold the gear accurately in position when it is not being operated. These locking means may be of any suitable character. Preferably, however, the shaft 47 is provided with a shoe 59 (see Fig. 5) said shoe being cut away so as to provide a concave surface which bears against the periphery of the disk 54 at all times except when the segment 53 is in engagement with the gear 46. It is apparent that as the segment 53 is about to run in engagement with the gear 46, the cut away portion 55 of the disk 54 will come opposite the locking shoe 59 so that as the segment engages the gear, the shoe will permit the gear to turn. When, however, the segment has effected a complete rotation of the gear 46 the shoe 59 again engages with the periphery of the disk 54 and prevents the gear from turning until it has been again engaged by the segment.

In the present machine, after the wrapper has been cut in the manner described, it is transferred by means of a wrapper support to a wrapping mechanism which forms a part of the organized machine. The wrapper support which is herein shown is substantially similar to that shown and described in Patent No. 654,203 above referred to, and the relative movement between the support and the wrapping mechanism by which the wrapper is transferred from the support to the wrapping mechanism is effected, as in the said machine, by moving the wrapper support. As in the said machine, furthermore, the wrapper is preferably retained on the support by means of a suction mechanism, and the support is given the various movements fully described in said patent. As set forth in the patent referred to, the support consists of a suction chamber 60 closed by a plate 61 which will be perforated as in said patent, the chamber being divided (see Fig. 5) by a partition 62 so as to form a blast chamber 63. The support is mounted on a large pipe 64 which is mounted on an arm 64'. In order to receive the movement by which the support is swung from the cutting bed to the wrapping mechanism, this arm 64' is supported on a stud 64" which is journaled on a hub 64"' shown as rising from the bed of the machine. It is desirable that the wrapper support be accurately positioned with respect to the wrapping mechanism at the time when it delivers the wrapper thereto. To this end, therefore, means are provided by which a relative adjustment between the support and the wrapping mechanism can be effected. While these means may be of any suitable character, in the construction shown (see Fig. 18), the lower end of the stud 64" rests on a threaded plug 64"" which is screwed into a recess in the lower end of the hub and is or may be secured in place by a lock nut. By this construction the wrapper support can be adjusted at an angle to the plane of its path of movement and toward or away from the wrapping mechanism, thus enabling its position with respect to the wrapping mechanism at the time when the wrapper is delivered to be definitely determined. The movement of the pipe 64 and the arm 64' is effected by a segment 65 carried on the stud 64" and a segment lever 66, the lever being swung by a cam groove in a drum 67 which is mounted on a shaft (see Figs. 1, 2 and 3) which extends across the machine from side to side, said shaft being mounted in bearings 68 and being provided with a worm wheel 69. This worm wheel 69 is driven from a worm 70 mounted on the main shaft 35.

It may be here remarked that the gear 58 before referred to as driving the gear 57 by which the segment 53 and the cutter operating gear 46 are actuated, is secured to the drum 67 and turns therewith. The support 60 also receives movements through cam grooves 71, 72 in a plate 73, levers 74, 75 and links 76, 77, the construction being substantially that shown and described in said Patent 654,203, and operating to give the support during the wrapping operation, a movement which is the resultant of an approaching, a traversing and an angular movement. During this movement the operating face of the wrapper support, in the particular machine shown, moves over the wrapping mechanism, that is to say, the wrapper is held in a plane which does not intersect the wrapping mechanism. The wrapper support, therefore, may be said to lie in such a plane, it being understood that the operating face of the wrapper support, that is to say, the face which holds the wrapper, is thus referred to.

As in the patent above referred to, the adhesive which is to secure the wrapper in position on the bunch is applied to the wrapper while it is held on the support. The pasting mechanism employed may be the same as that shown in the patent referred to, but the mechanism shown herein employs a pad 78 which is forced up against the wrapper when the support is at the extreme of its movement away from the cutting bed. The specific pasting mechanism herein partially illustrated forms the subject of Patent No. 751,224, dated Feb. 2, 1904, and need not, therefore, be more fully described herein. It has been found in practice that the adhesive applied to the wrapper is liable to soak through it and choke the openings in the suction plate 61. In the present machine, therefore, the top of the chamber 60 is provided with an opening (see Fig. 5) which is closed by a plate 79 held in position in any suitable manner, as by a wing nut 80. With this construction, the plate may be removed and the interior of the suction support wiped out or otherwise cleaned, when desired.

In the machine disclosed in said Patent No. 654,203, the end of the wrapper which is placed on the tuck end of the bunch is blown down into the jaws of the wrapping mechanism by a blast mechanism which operates through the blast chamber 63, the blast in said machine being obtained from a source exterior to the machine. In the specific mechanism selected to illustrate the invention, the wrapper is blown against the bunch in the wrapping mechanism by a blast but the blast is derived from mechanism which is located in and operated from the mechanism of the cigar machine. The particular form of mechanism by which the blast is obtained may be varied within wide limits. In the construction shown (see Figs. 6 and 8), the machine is provided with an air cylinder 81 supported on a bracket 82 or any other suitable manner. The cylinder is provided with a piston 83 which is operated through a piston rod 84 connected by a link 85 to a bell-crank lever 86, 87 pivoted at 88 to the frame of the machine. Any other form of connections, however, may be used for operating the piston, if desired. The bell-crank lever 86, 87 is operated from a cam 89 mounted on the countershaft 56. While the piston 83 might fit snugly in the cylinder 81, thus acting as a pump piston and being operated in both directions by the connections described, in the construction shown, the piston is loose in the cylinder and has secured to it a bellows 90. The cam 89 is so shaped that at the proper time the bowl carried by the arm 87 of the lever 86, 87 slips off it, and the weight of the piston causes the bellows to collapse. A pipe 91 opens into the air chamber through the bracket 82, said pipe having a nozzle 93 supported on a bracket 94 rising from the frame of the machine. This nozzle is backed up by a spring and is so located that as the suction support for the wrapper swings into the position where it begins to deliver the wrapper to the wrapping mechanism, it will register with a nozzle 95 (see Fig. 5) carried on the suction support and opening into the blast chamber. The cam 89 is so timed that it allows the piston 83 to drop at the time when the nozzles 93 and 95 come into register.

The wrapping mechanism employed may be of any suitable description. It may, however, consist of two pairs of intermeshing wrapping jaws 96, said jaws being constructed and operated generally as shown and described in the reissue patent to J. Reuse, No. 11,695, dated Sept. 20, 1898. The particular details of this wrapping mechanism are not necessary to an understanding of the present invention, and the same is not, therefore, described, the Reuse form of wrapping mechanism being shown simply for the purpose of generally indicating a wrapping mechanism. The Reuse patent referred to, however, shows a form of wrapping mechanism which may be adopted, if desired.

In the particular construction disclosed in this application, as well as in Patent 654,203 above referred to, the wrapper is drawn from the wrapper support by the wrapping mechanism against the force of the retaining means by which the wrapper is held on the support. The retaining means shown in the particular construction herein illustrated are the same as those of the machine of the patent referred to, to wit, that including a suction mechanism. In feeding wrappers automatically to a cigar machine by a device which holds the wrapper in an outspread condition, it has been found desirable to employ a wrapper controlling device which acts on the wrapper between the wrapper support and the wrapping mechanism, the purpose of this device being to guide the wrapper properly to the bunch and to overcome the tendency of the wrapper to wrinkle longitudinally. This device may also, under certain circumstances, exercise more or less tension on the wrapper. While this wrapper controlling device may be varied in its construction, in the particular embodiment of the invention shown, there is provided a tension plate or finger 97 which is so located as to act on the wrapper between the suction carrier and the wrapping mechanism, the wrapper being drawn over the end thereof by the rolling bunch in the wrapping mechanism. The construction by which this wrapper controlling device is mounted and operated may be varied and will vary according to the particular construction of the device. As shown, (see Figs. 1, 15, 16 and 17) the tension plate or finger is mounted on a bracket 99 which is supported on a rod 100 mounted in bearings 101 rising from the frame which supports the wrapping jaws. The finger is secured to the bracket by means of pivots 102, 103, the pivot 103 being in effect a short shaft. Secured to the pivot 103 so as to turn therewith is a block 104 to which a rearward extension 105 of the finger is secured in any suitable manner, as by means of a screw 106. A retainer 107 is provided which prevents the screw from being entirely withdrawn from the extension 105. The finger 97 is provided with a segment shaped lug 108 which fits into a recess in a cross web 109 of the bracket 99, the segment-shaped lug 108 being of sufficient extent so as not to pass out of the recess in the web 109 as the finger is operated. By unscrewing the screw 106 and swinging the finger upward on its pivots, until the segment shaped lug 108 passes out of the recess in the web 109, it can be readily removed from the bracket. In some cases and as shown, it may be desirable to cause this wrapper controlling device to bear against the wrapper on the support, and when this is done, the device should be held against the support yieldingly. In the construction illustrated, the plate or finger 97 is held against the support by a spring which may be located and arranged in any suitable manner. As shown, the pivot 103 is provided with an arm 110 having a series of notches thereon and a spring 111 is arranged to hook into any one of the notches in the arm, said spring being secured at any suitable point, as for instance, one of the bearings in which the rod 100 is mounted. The notches on the arm 110 enable the stress of the spring to be readily adjusted. It is desirable that the finger be arranged so that it can be moved into operative position as soon as the wrapping jaws have begun to wind the wrapper on the bunch and to be moved out of position before the wrapping is entirely completed, so as to avoid wiping off the paste which has been placed, as before described, on the under side of the end of the wrapper which is to be wound upon the tip end of the bunch. The construction by which the desired movements of the finger are produced may be of any suitable character. As shown, however, the bracket 99 is provided with an extension 112 which carries a roll 113, said roll engaging a groove in a cam 114 mounted on a shaft 115 which is one of the shafts of the wrapping mechanism. Pivoted on the rod 100 is a lever 116 carrying a bowl 117 which runs on the periphery of a cam 118 secured to the shaft 115. This lever 116 is connected by means of a link 119 to the block 104 before described. The cam 114 operates to give the tension finger a movement toward and away from the wrapper jaws and the lever 116 rocks the tension finger on its pivot to move it toward and away from the support. The cam 118 is, therefore, arranged to come into action just before the support in its movement brings the pasted portion of the wrapper over the tension finger, and the cam 114 rocks the finger toward and away from the wrapping jaws at the beginning and end of the movement by which the support delivers the wrapper to the wrapping mechanism.

It will, of course, be understood that the wrapping mechanism draws the wrapper along the support, and when the finger 97 is not used, it is found that the wrapper is liable to crawl on the support to an excessive degree. The finger, however, places sufficient tension on the wrapper to retard this crawling movement and at the same time assists the suction mechanism to hold the wrapper sufficiently strong against the pull of the wrapping jaws to insure that the wrapper will be properly stretched as it is wound upon the bunch.

In the machine disclosed in the Patent No. 654,203 the bunch or other material to be wrapped is placed in the wrapping mechanism by an automatic carrier and the wrapped product is removed from the wrapping mechanism by the same carrier. The present invention includes certain improvements in this automatic carrying mechanism. The mechanism by which this part of the invention is carried into effect may be varied within wide limits. The preferred mechanism, however, includes a carrier (see Figs. 4, 6, 9 and 10) which, in the present machine comprises an arm 120 mounted on a vertical shaft 121 which is rotated to produce the movement of the carrier. In the present machine, the means for rotating this shaft 121 consists of an arm 122 fast on the shaft, said arm being connected by a link 123 to an arm 124 mounted on a vertical shaft 125. This shaft 125 has secured to its lower end an arm 126 carrying a roller which engages a cam groove in a drum 127 mounted on the shaft 32. As the shaft rotates, the arms 124, 122 and the link 123 operate to give the shaft 121 and the carrier arm 120 a swinging movement toward and away from the wrapping mechanism. In the present machine, the carrier is arranged not only to deliver the bunch or other material to be wrapped to the wrapping mechanism, but to remove the wrapped product from the wrapping mechanism. To this end, therefore, the carrier is provided with two sets of retaining devices, which may be of any suitable construction, one set being arranged to transfer the bunch or material to be wrapped to the wrapping mechanism and the other to remove the wrapped product therefrom. As shown, the carrier is provided with two castings 128, 129. These castings are secured to the carrier in any suitable manner, and each of them has downwardly extending projections at each end thereof. The projections on the casting 128 are marked 130 and 131, and the projections on the casting 129 are marked 132 and 133. These downward projections are formed to provide concave recesses into which the tuck and tip ends of the cigar and bunch are fed. The casting 128 also serves to support a pair of rods 134 and the casting 129 serves to support a similar pair of rods 135. These rods are pivoted in the castings in any suitable manner, as by the cone pivots shown. The rods 134 serve to support a series of fingers 136 which are arranged between the projections 130, 131. Similarly, the rods 135 serve to support a series of fingers 137. These fingers are shaped as shown, that is, they have their lower ends bent inward and toward each other so as to support the cigar or bunch, as the case may be, and hold it in the concave recesses of the downward extensions before described.

Suitable means are provided for rocking the rods 134, 135 to open them for reciving and discharging means. Means are also preferably provided for positively ejecting the cigar or bunch which is held by the fingers, though gravity might be depended upon for this purpose. When, however, positive ejecting means is employed, this ejecting means will also be utilized for the purpose of opening the fingers. In the construction shown, an ejector 138 is located between the fingers 136, said ejector being carried on a stem 139 which is slidingly mounted in the carrier arm. Similarly, an ejector 140 is located between the fingers 137, said ejector being carried on a stem 141 also slidingly mounted in the carrier arm. The means by which the ejectors open the retaining fingers may be of any suitable construction. As shown, the ejector 140 is provided with a pin 142 which when the ejector is in its upper or inoperative position rest in recesses in the set of fingers 137. Similarly, the ejector 138 is provided with a pin 143 which when the ejector is in its upper position rest in recesses in the set of fingers 136. These recesses are slightly cam-shaped, as shown. When, therefore, the ejectors are given their downward movement, they open the fingers, this opening action taking place before the ejectors reach the cigar or bunch, as the case may be. The closing means for the ejectors preferably consist of springs, so that a yielding action may be exercised on the cigar bunch or cigar. These springs may be located and arranged in any suitable manner. As shown, the set of fingers 137 are connected by springs 144 and the fingers 136 by similar springs 145.

The means for operating the ejectors may be of any suitable description. As shown, the stem 139 of the ejector 138 is provided with a pin 146 which is engaged by a forked lever 147 pivoted at 148 to the carrier arm. Similarly, the stem 141 of the ejector 140 is provided with a pin 149 which is engaged by a forked lever 150 pivoted at 151 to the carrier arm. The lever 147 is held so as to keep the stem 139 in its upper position by means of a spring 152 and a similar spring 153 performs the same office for the lever 150. The means for operating these levers to lower the ejectors may be of any suitable character. The means used for this purpose, however, will be hereinafter described.

A suitable support is provided for the bunches or other material to be wrapped. While this support may be of any suitable description, it is preferably a traveling support and preferably also will be arranged so as not only to supply the bunches or other material to be wrapped to the bunch retaining devices of the carrier arm, but will also preferably be constructed to receive the wrapped product from the retaining devices which take this product from the wrapping mechanism. The construction of this support may be varied within wide limits. In the machine shown, however (see Figs. 1, 4, 6, and 9) the support consists of two endless chains 154, 155, said chains being connected by cross bars 156. These chains are shown as supported on drums 157, 158, the drums 158 being mounted on a shaft 159 which is journaled in a bracket 160 extending outward from the machine, and the drums 157 being mounted on a shaft 161 which is journaled in brackets 162, 163 also extending outward from the machine. The chains are provided with suitable holding devices. In the present instance, the links of the chains are concave on their upper surfaces, thus forming cradles which are adapted to receive both the bunches to be wrapped and the wrapped product. The shafts 159, 161 are preferably inclined to the horizontal, as shown, and the chain 155 is preferably provided with a stop 164 which consists of a series of angular brackets secured to the side of the chain. By inclining the chains to the horizontal, as shown, the bunches and cigars tend to slide downward in the cradles, this tendency being increased by the movement of the chains, and the stops 164 will accurately position the bunches and cigars in the cradles. The movement of the support may be produced in any suitable manner. In the construction shown, the shaft 161 is provided with a ratchet wheel 165 which is engaged by a suitable pawl on a pawl carrier 166. The pawl carrier is, or may be operated by a rod 167 which is secured to a bell-crank lever 168 (shown in dotted lines in Fig. 6), said bell-crank lever having on one of its ends a bowl or roller which bears on a cam mounted on the shaft 32.

The carrier 120, in the present machine, is so positioned with respect to the traveling support as to receive a bunch therefrom and deliver a wrapped bunch thereto, and is then so positioned with respect to the wrapping mechanism as to receive a wrapped bunch therefrom and deliver a bunch thereto. In the present machine, therefore, it is necessary that the retaining devices which receive the bunch from the support should be open at the time they receive the bunch and should be closed immediately thereafter, and should be opened to deliver the bunch to the wrapping mechanism. Similarly, the retaining devices which carry the wrapped bunch or cigar should be opened at the time they receive the cigar from the wrapping mechanism, should be closed immediately thereafter, and should be opened at the time they are to deliver the wrapped bunch or cigar to the support. These retaining devices are, therefore, controlled by independent mechanisms which have been hereinbefore described. The means for operating these independent mechanisms, which, as before stated, may be of any suitable character, comprise, in the present machine (see Figs. 1, 4 and 9) arms 169, 170, the arm 169 operating to actuate the controlling mechanisms for the retainers when they are in position with respect to the wrapping mechanism, and the arm 170 operating to actuate these mechanisms when they are in position with respect to the traveling support. These arms 169, 170 are mounted on a shaft 171 mounted in suitable bearings in the machine frame. This shaft 171 has an arm 172 extending therefrom which is connected by a link 173 to a lever 174 pivoted at 175 to the frame of the machine. The lever 174 carries a cam roll which works in a groove in a cam 176 which is secured to the drum 127 which is mounted on the shaft 32. The arms 169, 170 are arranged to strike the tails of the levers 147, 150, which have been described as controlling the movement of the ejectors for the retaining devices, when the same are in position. These arms, therefore, cause the levers 147, 150 to move against the stress of their springs and produce a downward movement of the ejectors, thus opening the retaining fingers.

In the present machine, the arrangement of the retaining devices is such that only one set of retainers will be in proper receiving position over the support or the wrapping mechanism, as the case may be, at the same time and, similarly, only one set of retainers will be in delivery position over the support or the wrapping mechanism, at the same time. In the machine shown herein, the retaining devices 136 receive the wrapped bunch or cigar from the wrapping mechanism and deliver it to the support and the retaining devices 137 receive the bunch from the support and deliver it to the wrapping mechanism. The carrier 120 is, therefore, so moved that the retaining devices 136 are in the present machine positioned over the wrapping jaws 96. When these devices are in this position, the arm 169 is operated to cause the ejector to descend and open the retaining devices. The wrapped bunch or cigar is then transferred by the lifters ordinarily employed with this wrapping mechanism into the retaining devices, it being noted that the ejector does not descend far enough to prevent the transfer of the cigar. As soon as the cigar has been placed in the grasp of the retaining devices, the arm 169 retreats, thus permitting the ejector to rise and the retaining devices to close. The carrier 120 is now given a short movement to bring the retaining devices 137 over the wrapping mechanism and the arm 169 is again operated to cause the ejector 140 to descend, open the retaining devices, and discharge the bunch into the wrapping jaws. The carrier 120 is now moved by its operating mechanism away from the wrapping mechanism to position the retaining devices 137 over the support, this movement being intermitted, however, in the present machine, to permit the operation of a cutting mechanism which trims the ends of the wrapped product carried by the retaining devices 136. When the jaws 137 are suitably positioned over the support, they are opened by the action of the arm 170 and a bunch is transferred to them.

In the present machine, devices are employed to lift the bunch from the support into the bunch retaining devices 137, and this lifting mechanism is also utilized to receive the wrapped bunch or cigar from the fingers 136 and deposit it in the holding devices of the support. The lifting mechanism by which the functions above referred to are accomplished may be constructed in any suitable manner. As shown, however, this lifting mechanism consists (see Figs. 1, 4, 6 and 9) of an arm 177 pivoted on a short shaft 178 mounted in an extension 179 which is secured to the bracket 162 before referred to as one of the supports for the shaft 161 of the bunch supporting mechanism. This arm 177 is preferably provided with two pairs of retainers 180, 181 between which the cigar or the bunch rests, as the case may be. The arm 177 is arranged to move between the bars 156 of the chains to remove the bunches from the cradles and to transfer the wrapped bunches or cigars to them. To this end, therefore, the arm 177 is formed with a deep recess 182 in order to clear the chain 154 as the arm moves upward. The upper position of the arm is indicated by dotted lines in Fig. 9. The means for moving this lifter arm 177 may be of any preferred form. In the construction shown, the shaft 178 has an arm 183 extending therefrom, said arm being connected by a link 184 to one of the arms 185, of a bell-crank lever 185, 186 pivoted to the frame of the machine. The arm 186 of the bell-crank carries a bowl which runs in a groove in a cam disk 187 mounted on the shaft 32 before described. After a bunch has been placed in the retaining devices 137, the carrier is given a slight additional movement to bring the retaining devices 136 into position to discharge a wrapped bunch. When the carrier has reached the proper position the lifting arm 177 is raised and the retaining devices 136 are opened to deposit a cigar on the lifter arm which in turn transfers it to the wrapper. The carrier is now swung on its pivot into receiving position over the wrapping mechanism.

In some cases, the vibration due to the rapidly operating mechanism of the machine may tend to displace the bunch or the cigar, as the case may be, as it lies in the retainers 180 of the arm 187. In order to prevent this displacement, the machine is or may be provided (see Fig. 9) with a guard plate 188 which is secured on a bracket 189 extending from the machine frame, this guard plate being so located as to prevent any endwise movement of the bunch or the cigar in the retainers as it is being transferred from the traveling support to the retaining devices of the carrier.

In the machine disclosed in said Patent No. 654,203, the wrapped product is trimmed while it is in the wrapping jaws. In the present machine, the trimming mechanism acts upon the finished product and while it is being transferred from the wrapping mechanism to its point of discharge, which, in the present case is the traveling support. The trimming mechanism may be of any suitable character, and may be operated by any desired means. Inasmuch, however, as the present machine is intended for making cheroots, the trimming mechanism will be of such a character as to trim both ends of the wrapped product. Referring more particularly to Figs. 1, 4, 6 and 12 to 14, the cutting mechanism which is preferably employed, consists of a pair of rotating cutters 190 mounted on a shaft 191 which is journaled in a head 192. In the present machine, inasmuch as the carrier is mounted on an arm which has a swinging movement about a center, it is desirable to have the cutters mounted so that they will be normally out of the path of the arm and will be moved into said path during the cutting operation. To this end, therefore, the head 192 is mounted in ways in a bracket 193 suitably secured to the machine frame. The means for moving the head so as to carry the cutters into and out of the path of movement of the carrier may be of any suitable description. As shown, the head is connected by means of a link 194,—said link including a turn-buckle 195,—to one of the arms 196, 197 of the bell-crank lever, said lever being pivoted at 198' to a bracket secured to the machine frame. The arm 197 is formed with a cam head 198 which is grooved as shown in dotted lines in Fig. 13. The groove in this cam head 198 at proper times is engaged by a stud 199 carried on the worm gear 33 which has been before described as mounted on the shaft 32 and driven by the worm 34 on the main shaft 35. As this stud enters the groove in the cam head 198 the bell crank 196, 197 is rocked and moves the cutters up into the path of the carrier. The bell crank is returned by means of a spring 200 attached to the arm 196 of the bell crank. In order, however, to prevent sticking, the groove in the cam head is given the configuration shown, so that the stud 199 will start the backward movement of the bell-crank. The cutters may be rotated by any suitable mechanism. In the construction shown, the shaft 191 is provided with a spiral gear 201 which meshes with a similar gear 202 mounted on a shaft 203 which is supported in a bearing in the movable head so as to move therewith. This shaft 203 near its lower end carries a spiral gear 204 which is secured to the shaft by a spline or feather 205, the construction being such as to permit the shaft to move through the gear but to be at all times turned thereby. This gear is held between the forks of a bracket 206 secured to the frame, said bracket preventing the gear from having any vertical movement. The gear 204 is driven by a spiral gear 207 mounted on the main shaft 35. It will be apparent that by the construction described, the cutters are constantly rotated, are moved up into the path of the carrier when the cutting operation is to take place and are returned to normal position after the cutting operation is completed.

It has been before stated that the carrier is moved to first bring one set of retaining devices into position with respect to the wrapping mechanism and then the other set and that it is given similar movements with respect to the bunch support. The carrier, therefore, has two periods of rest with respect to the wrapping mechanism, and two periods of rest with respect to the support. When, furthermore, as in the present machine, the carrier moves in the arc of a circle, it is also desirable that it be brought to a position of rest when the cutting mechanism operates. In the present construction, therefore, the carrier in making a complete reciprocation from the support to the wrapping mechanism and back again, has five periods of rest. In order to insure that the carrier be accurately positioned during its periods of rest with respect to the mechanisms with which it coöperates at such times, suitable locking devices are preferably provided. These locking devices may be varied widely in construction. In the present machine, the carrier is provided (see Figs. 1, and 9) with a notched disk 208, the notches being suitably arranged therein so that one of them will be in position to be engaged by a coöperating locking member whenever the carrier is in one of its positions referred to. In the present machine, the member which coöperates with the notched disk to lock the same is a pivoted bell-crank 209, 210 pivoted at 211 to a small bracket fast on the side of the frame. The arm 209 of this bell-crank is positioned so that at proper times it will engage the notches in the disk 208, and a spring 212 is so arranged as to draw the arm 209 into one of the notches whenever it is free to act. The arm 210 of the bell-crank is so positioned as to be struck by the arm 170 before described as operating the levers which produce the movement of the ejectors. It will be remembered that this arm 170 is mounted on a shaft 171 which is operated from a suitable cam through the connections described. The configuration of the cam is such as to not only give the arm 170 the movement required to operate the ejector levers, but also the movements which release the bell-crank 209, 210 in order to permit it to be thrown into locking position and force it out of said position.

The operation of the machine will be apparent from the description heretofore given, especially when taken in connection with the disclosure contained in Patent No. 654,203, and a further detailed description is not, therefore, necessary.

It is to be understood that the various mechanisms by which the operations performed in carrying out the invention may be varied within wide limits. It is to be further understood that certain parts of the invention are capable of use independently of other parts and that such independent use is contemplated. The invention is not, therefore, to be confined to the specific details of construction hereinbefore described.

What is claimed is:

1. The combination with a cutting bed having a knife, of a reciprocating carriage, a coöperating cutting device carried thereby, a lever, connections between the lever and the carriage, a crank, connections between the lever and the crank, a gear for operating the crank, and means for intermittently driving the gear, substantially as described.

2. The combination with a cutting bed having a knife, of a reciprocating carriage, a coöperating cutting device carried thereby, a lever, connections between the lever and the carriage, a crank, connections between the lever and the crank, a gear for operating the crank, means for intermittently driving the gear, and means for locking the gear when it is not being driven, substantially as described.

3. The combination with a cutting bed having a knife, of a reciprocating carriage, a coöperating cutting device carried thereby, a lever connected to the carriage, a crank, a gear for operating the crank, a disk having a cut-away portion, a segment mounted on the disk opposite said cut-away portion, and a shoe moving with the gear and arranged to bear upon the disk except at the cut-away portion, substantially as described.

4. The combination with a cutting knife, of suction holding means on each side of the knife, and means whereby the suction on one side of the knife may be controlled independently of the suction on the other side of the knife.

5. The combination with a knife of die form, of suction holding means located on the interior of the knife, suction holding means located on the exterior of the knife, and means for independently controlling the suction holding means, substantially as described.

6. The combination with a bed having a knife, of suction plates lying on opposite sides of the knife, suction chambers beneath said plates, means for independently controlling the suction in said chambers, and means for producing a relative movement between the plates, substantially as described.

7. In a cutting mechanism, the combination with a knife, of suction plates lying on opposite sides of the knife, suction chambers beneath said plates, an intermediate suction chamber, connections from said intermediate chamber to the chambers lying beneath the plates, means for independently controlling said connections, and means for producing a relative movement between the plates, substantially as described.

8. The combination with a knife, of an interior suction plate, suction producing means in communication with said plate, means for producing suction exterior to the knife, means for independently controlling the interior and exterior suction, and means for moving the interior plate with respect to the knife, substantially as described.

9. In a cutting mechanism, the combination with a knife, of an interior suction plate surrounded by said knife, a suction plate exterior to the plates, suction chambers beneath the plates, a suction mechanism, connections from the suction mechanism to the chambers, means for cutting off the suction from the chamber beneath the interior plate while it is allowed to act in the chamber beneath the exterior plate, and means for moving the interior plate, substantially as described.

10. In a cutting mechanism, the combination with a knife, of an interior suction plate surrounded by said knife, a suction plate exterior to the knife, suction chambers beneath the plates, an intermediate two-part suction chamber, a pipe leading from one part of said intermediate chamber to the chamber beneath the exterior plate, a pipe leading from the other part of said two-part chamber to the chamber beneath the interior plate, a suction pipe leading to said intermediate chamber, a valve arranged to successively open and close the connection between said pipe and each part of the chamber, and means for moving the interior plate, substantially as described.

11. In a cigar machine, the combination with an air chamber, of a piston, a wrapper support, means for establishing a connection between the air chamber and the support, means connected with the operating parts of the machine for moving the piston in one direction, and means for moving the piston in the opposite direction, substantially as described.

12. In a cigar machine, the combination with a wrapping mechanism, of a suction wrapper support, means for moving said support with respect to the wrapping mechanism so as to deliver the wrapper thereto, a blast chamber located at one end of the support, an air chamber, a pipe leading from said chamber, a nozzle on said pipe so located that a connection between it and the blast chamber is established when the support comes into delivery position, a piston in the air chamber, and connections between the piston and an operating part of the machine for moving the piston, substantially as described.

13. The combination with a wrapping mechanism, of a wrapper support lying in a plane which does not intersect the wrapping mechanism, said support being provided with means for retaining the wrapper thereon in an outspread condition, means for producing a relative movement between the wrapping mechanism and the support during the wrapping operation, and a wrapper controlling device operating on the wrapper between the support and the wrapping mechanism.

14. The combination with a wrapping mechanism, of a wrapper support, means for retaining the wrapper on the support in a stretched condition, and a wrapper controlling device operating on the wrapper between the support and the wrapping mechanism.

15. The combination with a wrapping mechanism, of a suction support upon which the wrapper is held and from which it is drawn by the wrapping mechanism during the wrapping operation, and a wrapper controlling device operating on the wrapper between the support and the wrapping mechanism, substantially as described.

16. The combination with a wrapping mechanism, of a wrapper support, means for holding a wrapper on the under side of said support, and a wrapper controlling device operating on the wrapper between the support and the wrapping mechanism.

17. The combination with a wrapping mechanism, of a wrapper support lying in a plane which does not intersect the wrapping mechanism, and a wrapper controlling device operating on the wrapper between the support and the wrapping mechanism.

18. The combination with a wrapping mechanism, of a suction wrapper support lying in a plane which does not intersect the wrapping mechanism, and a wrapper controlling device operating on the wrapper between the support and the wrapping mechanism.

19. The combination with a wrapping mechanism, of a wrapper support, means for retaining the wrapper on the support in a stretched condition, means for producing a relative movement between the wrapping mechanism and the support, and a wrapper controlling device operating on the wrapper between the support and the wrapping mechanism.

20. The combination with a wrapping mechanism, of a suction wrapper support, means for producing a relative movement between the wrapping mechanism and the support, and a wrapper controlling device operating on the wrapper between the support and the wrapping mechanism.

21. The combination with a wrapping mechanism, of a suction wrapper support, a wrapper controlling device operating on the wrapper between the support and the wrapping mechanism, and means for producing a relative movement between the support and the wrapper controlling device as the wrapper is delivered from the support, substantially as described.

22. The combination with a wrapping mechanism, of a wrapper support, means for retaining a wrapper thereon in a stretched condition, a wrapper controlling device, and means for producing a relative movement between the support and the wrapper controlling device as the wrapper is delivered to the wrapping mechanism, substantially as described.

23. The combination with a wrapping mechanism, of a suction wrapper support, a wrapper controlling device, and means for producing a relative movement between the support and the wrapper controlling device as the wrapper is delivered to the wrapping mechanism, substantially as described.

24. The combination with a wrapping mechanism, of a wrapper support, means for retaining a wrapper thereon in a stretched condition, a wrapper controlling device, and means for producing a relative movement between the support, the wrapping mechanism and wrapper controlling device, substantially as described.

25. The combination with a wrapping mechanism, of a suction wrapper support, a wrapper controlling device, and means for producing a relative movement between the support and the wrapping mechanism and wrapper controlling device, substantially as described.

26. The combination with a wrapping mechanism, of a suction wrapper support lying in a plane which does not intersect the wrapping mechanism, a wrapper controlling device operating on the wrapper between the support and the wrapping mechanism, and means for producing a relative movement between the support and the wrapper controlling device as the wrapper is delivered, substantially as described.

27. The combination with a wrapping mechanism, of a suction wrapper support, a wrapper controlling device for the wrapper mounted on the wrapping mechanism, and means for producing a relative movement between the support and the wrapping mechanism, substantially as described.

28. The combination with a wrapping mechanism, of a wrapper support, means for moving the wrapper support with respect to the wrapping mechanism during the wrapping operation, and a wrapper controlling device mounted upon the wrapping mechanism and operating to hold the wrapper against the support, substantially as described.

29. The combination with a wrapping mechanism, of a suction wrapper support, means for moving the wrapper support with respect to the wrapping mechanism during the wrapping operation, and a wrapper controlling device mounted upon the wrapping mechanism and operating to hold the wrapper against the support, substantially as described.

30. The combination with a wrapping mechanism, of a wrapper support, a spring controlled finger operating to hold the wrapper against the support, and means for producing a relative movement between the support and the wrapping mechanism, substantially as described.

31. The combination with a wrapping mechanism, of a suciton wrapper support, a spring controlled finger operating to hold the wrapper against the support, and means for producing a relative movement between the support and the wrapping mechanism, substantially as described.

32. The combination with a wrapping mechanism, of a suction wrapper support, a spring controlled finger mounted on the wrapping mechanism and operating to hold the wrapper against the support, and means for producing a relative movement between the support and the wrapping mechanism, substantially as described.

33. The combination with a wrapping mechanism, of a wrapper support, means for maintaining the wrapper on the support, a wrapper controlling device operating on the wrapper between the support and the wrapping mechanism, and means for moving said device into and out of operative position.

34. The combination with a wrapping mechanism, of a suction wrapper support, a wrapper controlling device operating on the wrapper between the support and the wrapping mechanism, and means for moving said device into and out of operative position.

35. The combination with a wrapping mechanism, of a wrapper support, means for retaining the wrapper thereon in an outspread condition, a wrapper controlling finger operating on the wrapper between the support and the wrapping mechanism, and means for moving the finger into and out of operative position.

36. The combination with a wrapping mechanism, of a suction wrapper support, a spring controlled finger operating to hold the wrapper against the support, means for producing a relative movement between the finger and the support as the wrapper is delivered to the wrapping mechanism, and means for moving the finger away from the support before the wrapper is entirely delivered therefrom, substantially as described.

37. The combination with a wrapping mechanism, of a wrapper support, means for producing a relative movement between the wrapper support and the wrapping mechanism, a wrapper controlling device, and means for moving the wrapper controlling device into operative position when the support and wrapping mechanism are in delivery position, substantially as described.

38. The combination with a wrapping mechanism, of a wrapper support, means for producing a relative movement between the wrapper support and the wrapping mechanism, a wrapper controlling device, means for moving the wrapper controlling device into operative position when the support and wrapping mechanism are in delivery position, and means for throwing the wrapper controlling device out of operation before the wrapper has been entirely delivered from the support, substantially as described.

39. The combination with a wrapping mechanism, of a suction wrapper support, means for producing a relative movement between the wrapper support and the wrapping mechanism, a wrapper controlling device, means for moving the wrapper controlling device into operative position when the support and the wrapping mechanism are in delivery position, and means for throwing the wrapper controlling device out of operation before the wrapper has been entirely delivered from the support, substantially as described.

40. The combination with a wrapping mechanism, of a wrapper support, a bracket, a finger mounted in the bracket, means for moving the bracket to position the finger with respect to the support, and means for moving the finger to throw it into or out of operation, substantially as described.

41. The combination with a wrapping mechanism, of a suction wrapper support, a bracket, a finger mounted in the bracket, means for moving the bracket to position the finger with respect to the support, and means for moving the finger to throw it into or out of operation, substantially as described.

42. The combination with a wrapping mechanism, of a suction wrapper support, means for producing a relative movement between the wrapper support and the wrapping mechanism, a bracket, a finger mounted in the bracket, means for moving the bracket to position the finger with respect to the support, and means for moving the finger to throw it into or out of operation, substantially as described.

43. The combination with a wrapping mechanism, of a wrapper support, a bracket, a finger mounted on the bracket, means for moving the bracket to position the finger with respect to the support, a spring for throwing the finger against the wrapper support and maintaining it thereagainst, and means for moving the finger away from the support, substantially as described.

44. The combination with a wrapping mechanism, of a suction wrapper support, a bracket, a finger mounted on the bracket, means for moving the bracket to position the finger with respect to the support, a spring for throwing the finger against the wrapper support and maintaining it thereagainst, and means for moving the finger away from the support, substantially as described.

45. The combination with a wrapping mechanism, of a wrapper support, means for producing a relative movement between the wrapper support and the wrapping mechanism, a bracket, a finger mounted on the bracket, means for moving the bracket to position the finger with respect to the support, a spring for throwing the finger against the wrapper support and maintaining it thereagainst, and means for moving the finger away from the support, substantially as described.

46. The combination with a wrapping mechanism, of a suction wrapper support, means for producing a relative movement between the wrapper support and the wrapping mechanism, a bracket, a finger mounted on the bracket, means for moving the bracket to position the finger with respect to the support, a spring for throwing the finger against the wrapper support and maintaining it thereagainst, and means for moving the finger away from the support, substantially as described.

47. The combination with a wrapping mechanism, of a carrier, two sets of retaining devices mounted on the carrier, means for moving the carrier to position one set of retaining devices to take a wrapped product from the wrapping mechanism and to position the other set of retaining devices to deliver the material to be wrapped to the wrapping mechanism, substantially as described.

48. The combination with a wrapping mechanism, of a carrier provided with two sets of retaining devices, a source of supply for the material to be wrapped, and means for moving the carrier to bring one set of retaining devices into receiving position with respect to the source of supply, then to bring the other set of retaining devices into receiving position with respect to the wrapping mechanism, then to bring the first set of retaining devices into delivery position with respect to the wrapping mechanism, and then to move back to the source of supply, substantially as described.

49. The combination with a wrapping mechanism, of a support operating to hold bunches and wrapped cigars, a carrier having two sets of retaining devices, and means for moving the carrier between the wrapping mechanism and the support, substantially as described.

50. The combination with a wrapping mechanism, of two sets of retaining devices arranged to be opened and closed, means for moving said devices toward and away from the wrapping mechanism, and means for independently opening and closing the retaining devices, substantially as described.

51. The combination with a wrapping mechanism, of a carrier, two sets of retaining devices mounted thereon, means for giving the carrier movements toward the wrapping mechanism, so that one set of retaining devices may receive a wrapped product therefrom and the other may deliver the material to be wrapped thereto, and means for independently opening and closing each set of retaining devices, substantially as described.

52. The combination with a wrapping mechanism, of a carrier, two sets of retaining devices on the carrier, means for moving the carrier to bring the sets of retaining devices successively into coöperative relation with the wrapping mechanism, whereby one set of retaining devices receives a wrapped product from the wrapping mechanism and the other set of devices delivers the material to be wrapped thereto, means for closing the set of devices which receives the wrapped product, and means for opening the other set, substantially as described.

53. The combination with a wrapping mechanism, of a support for the wrapped product and material to be wrapped, a carrier, two sets of retaining devices mounted thereon, means for moving the carrier so as to bring the sets of retaining devices successively into receiving and delivery positions with respect to the wrapping mechanism and into receiving and delivery positions with respect to the support, and means for independently opening and closing the devices, substantially as described.

54. The combination with a wrapping mechanism, of a support constructed to sustain bunches, a carrier, means for operating the carrier to transfer bunches from the support to the wrapping mechanism, and means for moving the bunch support to bring the bunches within the range of action of the carrier.

55. The combination with a wrapping mechanism, of a flexible bunch support, means for giving the bunch support a traveling movement, a carrier, means for operating the carrier to transfer bunches from the support to the wrapping mechanism, and means for operating the support to bring the bunches within the range of action of the carrier.

56. The combination with a wrapping mechanism, of means for automatically supplying wrappers thereto, a bunch support constructed to sustain a plurality of bunches, means for transferring bunches from the support to the wrapping mechanism, and means for operating the support to bring the bunches successively within the range of action of the transferring means.

57. The combination with a wrapping mechanism, of means for automatically supplying wrappers thereto, a flexible bunch support constructed to sustain a plurality of bunches, means for transferring bunches from the support to the wrapping mechanism, and means for operating the support to bring the bunches successively within the range of action of the transferring means.

58. The combination with a wrapping mechanism, of a support provided with holding devices for receiving cigars and bunches, a carrier having retaining devices, and means for moving the carrier between the support and the wrapping mechanism, substantially as described.

59. The combination with a wrapping mechanism, of a traveling support having holding devices for receiving bunches and cigars, a carrier having two sets of retaining devices, means for moving the carrier so as to bring the retaining devices into receiving and delivery positions with respect to the support and wrapping mechanism, and means for opening and closing the retaining devices, substantially as described.

60. The combination with a wrapping mechanism, of a carrier having retaining devices, means for moving the carrier toward and away from the wrapping mechanism, an ejector coöperating with the retaining devices, means for moving the ejector, and means operated by the movement of the ejector for opening the retaining devices, substantially as described.

61. The combination with a wrapping mechanism, of a carrier having a plurality of sets of retaining devices, means for moving the carrier toward and away from the wrapping mechanism, and a plurality of sets of ejectors, one for each retaining device, substantially as described.

62. The combination with a carrier, of a pair of rods mounted thereon, retaining fingers mounted on the rods, an ejector mounted in the carrier and located between the fingers, means for moving the ejector, means whereby the movement of the ejector opens the fingers, and means for closing the fingers, substantially as described.

63. The combination with a wrapping mechanism, of a support, a carrier, two pairs of rods mounted thereon, retaining fingers carried by the rods, an ejector located between each pair of fingers, means for moving the carrier between the support and the wrapping mechanism, means for operating the ejectors, and means whereby the movement of the ejectors opens the fingers, substantially as described.

64. In a cigar machine, the combination with an endless flexible support for bunches or cigars, of means for sustaining and operating the support with one side above the other whereby each cigar is held in a plane inclined to the horizontal, substantially as described.

65. In a cigar machine, the combination with an endless flexible support, of means for sustaining and operating the support with one side above the other whereby each cigar is held in a plane inclined to the horizontal, and means for positioning the cigars or bunches in said support, substantially as described.

66. In a cigar machine, the combination with an endless flexible support having bunch holding devices, of means for supporting and moving the same with one side higher than the other whereby the bunches are held in a plane inclined to the horizontal, and an ejector arranged to remove the bunches from the support, substantially as described.

67. In a cigar machine, the combination with an endless flexible support provided with a series of bunch holding cradles, of means for sustaining and operating the support, and an ejector arranged to remove the bunches from the cradles, substantially as described.

68. In a cigar machine, the combination with a wrapping mechanism, of an endless traveling support having bunch retaining devices, an ejector for removing the bunches from the support, and a carrier for transferring the bunches to the wrapping mechanism, substantially as described.

69. In a cigar machine, the combination with a wrapping mechanism, of an endless flexible bunch support, means for moving the same in a plane inclined to the horizontal, an ejector, a carrier for transferring the bunches from the support to the wrapping mechanism, and an ejector for removing the bunches from the support and presenting them to the carrier, substantially as described.

70. The combination with a wrapping mechanism, of an endless traveling support having holding devices, a carrier having two sets of retaining devices, and means for operating the carrier to transfer the bunches from the support to the wrapping mechanism, and for removing the wrapped bunches from the wrapping mechanism to the support, substantially as described.

71. The combination with a wrapping mechanism, of an endless traveling bunch support having holding devices, means for moving the same, a carrier having two sets of retaining devices, ejectors for operating said sets of retaining devices and insuring the delivery of the cigars and bunches therefrom, an ejector arranged to transfer the bunches from the support to one set of retaining devices on the carrier, and means for moving the carrier between the support and the wrapping mechanism, substantially as described.

72. The combination with a wrapping mechanism, of an endless traveling bunch support having holding devices, means for moving the same in a plane inclined to the horizontal, a carrier having two sets of retaining devices, ejectors for operating said sets of retaining devices and insuring the delivery of the cigars and bunches therefrom, an ejector arranged to transfer the bunches from the support to one set of retaining devices on the carrier, and means for moving the carrier between the support and the wrapping mechanism, substantially as described.

73. The combination with a wrapping mechanism, of an endless traveling support having holding cradles, drums on which said support is mounted, means for giving the drums a step by step movement, said drums being arranged so that the support moves in a plane which is inclined to the horizontal, an ejector coöperating with the support, a carrier provided with two sets of retaining devices, an ejector for each set of retaining devices, and means for moving the carrier between the wrapping mechanism and the support, substantially as described.

74. The combination with a wrapping mechanism, of a bunch support, a carrier having retaining devices, means for moving the carrier into receiving position with respect to the bunch support and into delivery position with respect to the wrapping mechanism, and means for locking the carrier in each of these positions, substantially as described.

75. The combination with a wrapping mechanism, of a moving support having holding devices for bunches and cigars, of a carrier having two sets of retaining devices, means for moving the carrier into receiving and delivery positions with respect to the support, and into receiving and delivery positions with respect to the wrapping mechanism, and means for locking the carrier in each of said positions, substantially as described.

76. The combination with a wrapping mechanism, of a support, a carrier having retaining devices, means for moving the carrier into receiving and delivery positions with respect to the support and the wrapping mechanism, means for locking the carrier in position at both of these points, a cutting mechanism located between the support and the wrapping mechanism, and means for locking the carrier while the cutting mechanism is in operation, substantially as described.

77. The combination with a wrapping mechanism, of a moving support having holding devices for bunches and cigars, a cutting mechanism located between the wrapping mechanism and the support, a carrier having two sets of retaining devices, one for bunches and one for cigars, means for moving the carrier into receiving and delivery positions with respect to the support and into receiving and delivery positions with respect to the wrapping mechanism and into position where the cigars may be operated upon by the cutting mechanism, and means for locking the carrier in each of said positions, substantially as described.

78. The combination with a wrapping mechanism, of a carrier having retaining devices for cigars, means for moving the carrier toward and away from the wrapping mechanism, a cutting mechanism, and means for moving the cutting mechanism into and out of the path of the carrier, substantially as described.

79. The combination with a wrapping mechanism, of a carrier for receiving a wrapped cigar, means for moving the carrier toward the wrapping mechanism and away from it to a delivery point, means for bringing the carrier to a stop before it reaches the delivery point, a cutting mechanism, and means for moving it into the path of the carrier while the carrier is at rest so as to trim the cigar held thereby.

80. The combination with a wrapping mechanism, of a carrier having bunch retaining devices thereon, means for moving the carrier toward and away from the wrapping mechanism, a constantly running cutting mechanism, and means for moving said mechanism into and out of the path of the carrier, substantially as described.

81. The combination with a bunch support, of a wrapping mechanism, a carrier having retaining devices, means for operating the carrier to take a bunch from the support and deliver it to the wrapping mechanism and for taking the wrapped cigar from the wrapping mechanism and carrying it to a delivery point, and cutting mechanism for trimming the cigar while it is in the retaining devices of the carrier, substantially as described.

82. The combination with a wrapping mechanism, of a carrier having retaining devices, means for moving the carrier from the wrapping mechanism to a delivery point, means for locking the carrier in position between the wrapping mechanism and the delivery point, a cutting mechanism, and means for moving said mechanism into and out of the path of the carrier, substantially as described.

83. The combination with a wrapping mechanism, of a carrier, means for moving the carrier between the wrapping mechanism and a delivery point, a pair of rotating cutters, and means for moving the cutters into and out of the path of the carrier, substantially as described.

84. In a cigar machine, the combination with a wrapping mechanism, of a support provided with a plurality of holding devices, means for transferring a bunch from the support to the wrapping mechanism, means for presenting a wrapper to the wrapping mechanism, and means for delivering the wrapped cigar to the support, substantially as described.

85. In a cigar machine, the combination with a wrapping mechanism, of a support having a plurality of holding devices, means for transferring a bunch from the support to the wrapping mechanism, means for presenting a wrapper to the wrapping mechanism, means for transferring the wrapped cigar from the wrapping mechanism to the support, and a cutting mechanism operating to trim the wrapped cigar between the wrapping mechanism and the support, substantially as described.

86. In a cigar machine, the combination with a wrapping mechanism, of a suction wrapper support, means for delivering a wrapper thereto, a traveling support having holding devices for cigars and bunches, a carrier having two sets of retaining devices, one for bunches and one for cigars, means for giving the carrier movements between the support and the wrapping mechanism so as to cause it to receive a bunch from and deliver a cigar to the traveling support, and to deliver a bunch to and receive a cigar from the wrapping mechanism, and means for operating the wrapper support to deliver a wrapper to the wrapping mechanism, substantially as described.

87. In a cigar machine, the combination with a wrapping mechanism, of a suction wrapper support, means for delivering a wrapper thereto, a traveling support having holding devices for bunches and cigars, a cutting mechanism located between the wrapping mechanism and the traveling support, a carrier having two sets of retaining devices, one for bunches and the other for cigars, means for operating the carrier so as to cause its retaining devices to deliver a bunch to and receive a wrapped cigar from the wrapping mechanism and to deliver a cigar to and receive a bunch from the traveling support, the cigar being trimmed by the cutting mechanism as it is removed from the wrapping mechanism to the support, and means for operating the wrapper support so as to cause it to deliver a wrapper to the wrapping mechanism, substantially as described.

88. The combination with a wrapping mechanism, of means for presenting a wrapper thereto, means for transferring the tuck end of the wrapper to the bunch in the wrapping mechanism and hold it against the bunch, and a wrapper controlling device operating on the wrapper between the presenting device and the wrapping mechanism.

89. The combination with a wrapping mechanism, of a suction wrapper presenting device, means for transferring the tuck end of the wrapper to the bunch in the wrapping mechanism and holding it against the bunch, and a wrapper controlling device operating on the wrapper between the presenting device and the wrapping mechanism.

In testimony whereof, I have hereunto set my hand, in the presence of two subscribing witnesses.

OLUF TYBERG.

Witnesses:
SYDNEY I. PRESCOTT,
A. A. V. BOURKE.